United States Patent
Shimizu et al.

(10) Patent No.: US 11,104,180 B2
(45) Date of Patent: Aug. 31, 2021

(54) PNEUMATIC TIRE

(71) Applicant: The Yokohama Rubber Co., LTD., Tokyo (JP)

(72) Inventors: Katsunori Shimizu, Hiratsuka (JP); Tsuyoshi Nomaguchi, Hiratsuka (JP)

(73) Assignee: The Yokohama Rubber Co., LTD.

( * ) Notice: Subject to any disclaimer, the term of this patent is extended or adjusted under 35 U.S.C. 154(b) by 240 days.

(21) Appl. No.: 16/092,192

(22) PCT Filed: Mar. 31, 2017

(86) PCT No.: PCT/JP2017/013567
§ 371 (c)(1),
(2) Date: Oct. 8, 2018

(87) PCT Pub. No.: WO2017/175675
PCT Pub. Date: Oct. 12, 2017

(65) Prior Publication Data
US 2019/0126682 A1 May 2, 2019

(30) Foreign Application Priority Data

Apr. 8, 2016 (JP) .............................. JP2016-077949

(51) Int. Cl.
*B60C 1/00* (2006.01)
*B60C 9/20* (2006.01)
(Continued)

(52) U.S. Cl.
CPC .................. *B60C 1/00* (2013.01); *B60C 9/04* (2013.01); *B60C 9/20* (2013.01); *C08K 3/06* (2013.01);
(Continued)

(58) Field of Classification Search
CPC ................. B60C 2001/0066; B60C 2009/045
See application file for complete search history.

(56) References Cited

U.S. PATENT DOCUMENTS

| 4,140,166 A * | 2/1979 | Koyama | ................... B60C 9/20 152/537 |
| 4,657,058 A * | 4/1987 | Kabe | ......................... B60C 9/08 152/556 |

(Continued)

FOREIGN PATENT DOCUMENTS

| EP | 0481080 A1 * | 4/1992 | ........... D07B 1/0666 |
| JP | H01-240304 | 9/1989 | |

(Continued)

OTHER PUBLICATIONS

International Search Report for International Application No. PCT/JP2017/013567 dated Jul. 4, 2017, 4 pages, Japan.

*Primary Examiner* — Liam J Heincer
(74) *Attorney, Agent, or Firm* — Thorpe North & Western

(57) ABSTRACT

A pneumatic tire includes a belt layer and a carcass layer. A rubber composition for belts, constituting the belt layer, contains, per 100 parts by mass of a diene rubber containing a natural rubber, from 0.3 to 1.5 parts by mass of cobalt borate neodecanoate and from 4.5 to 7.0 parts by mass of sulfur. The dynamic storage modulus at 20° C. of the rubber composition for belts is from 13 to 18 MPa, and a ratio of a 100% tensile stress of the rubber composition for belts to a 100% tensile stress of a rubber composition for carcasses, constituting the carcass layer is from 1.5 to 2.5.

2 Claims, 1 Drawing Sheet

(51) Int. Cl.
*C08K 5/55* (2006.01)
*C08L 7/00* (2006.01)
*B60C 9/04* (2006.01)
*C08K 3/06* (2006.01)
*C08L 61/00* (2006.01)
*B60C 9/00* (2006.01)
*B60C 9/18* (2006.01)

(52) U.S. Cl.
CPC ................. *C08K 5/55* (2013.01); *C08L 7/00* (2013.01); *C08L 61/00* (2013.01); *B60C 9/0007* (2013.01); *B60C 2001/0066* (2013.01); *B60C 2009/1828* (2013.01)

(56) References Cited

U.S. PATENT DOCUMENTS

| | | | | | |
|---|---|---|---|---|---|
| 5,014,761 | A | * | 5/1991 | Noma | B60C 9/08 152/451 |
| 5,105,866 | A | * | 4/1992 | Miwa | B60C 9/26 152/528 |
| 5,674,331 | A | * | 10/1997 | Saeki | B60C 9/18 152/209.5 |
| 5,779,828 | A | * | 7/1998 | Okamoto | B60C 9/18 152/526 |
| 5,885,385 | A | * | 3/1999 | Noji | B60C 9/12 152/458 |
| 6,427,743 | B1 | * | 8/2002 | Ueyoko | B60C 5/142 152/525 |
| 6,530,410 | B1 | * | 3/2003 | Obana | B60C 9/0007 152/451 |
| 2006/0089439 | A1 | * | 4/2006 | Miyazaki | C08K 5/55 524/394 |
| 2007/0232737 | A1 | * | 10/2007 | Miyazaki | C08L 21/00 524/435 |
| 2008/0156409 | A1 | * | 7/2008 | Yokokura | B60C 9/09 152/517 |
| 2011/0263761 | A1 | * | 10/2011 | Matsuda | C08K 5/3475 524/91 |
| 2012/0225974 | A1 | * | 9/2012 | Uno | C08L 7/00 523/155 |
| 2014/0228495 | A1 | * | 8/2014 | Miyazaki | C08L 9/00 524/322 |
| 2019/0359797 | A1 | * | 11/2019 | Sugimoto | C08L 9/00 |

FOREIGN PATENT DOCUMENTS

| | | |
|---|---|---|
| JP | 2003-159909 | 6/2003 |
| JP | 2006-124474 | 5/2006 |
| JP | 2007-099868 | 4/2007 |
| JP | 2010-000993 | 1/2010 |
| JP | 2013-122038 | 6/2013 |
| WO | WO 2013/069359 | 5/2013 |

* cited by examiner

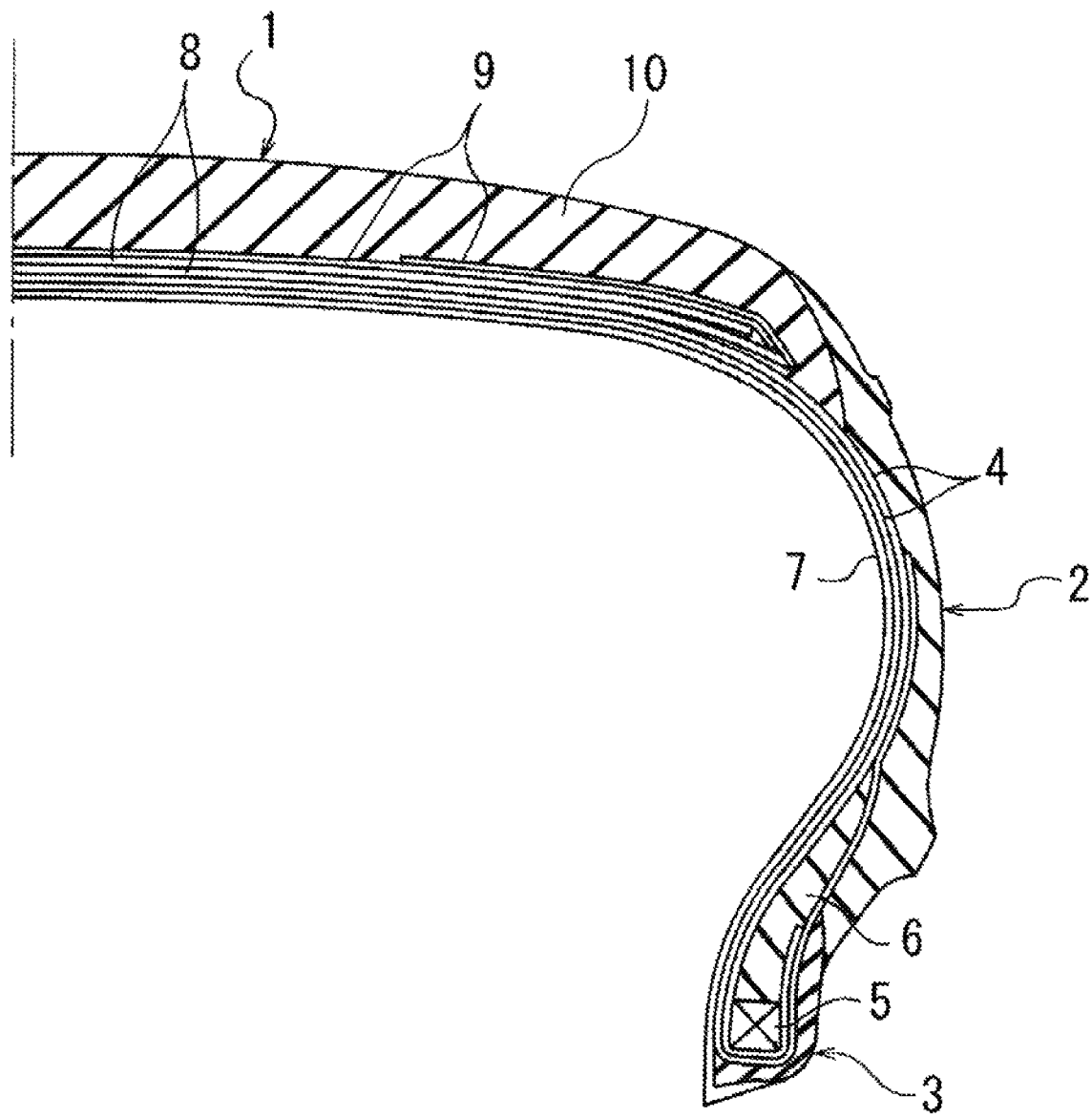

PNEUMATIC TIRE

TECHNICAL FIELD

The present technology relates to a pneumatic tire that suppresses edge separation at a belt layer.

BACKGROUND ART

Some pneumatic tires have a tread portion formed from a belt layer and a carcass layer in which steel cords are coated with a coating rubber (rubber composition for coating steel cords). As adhesiveness between these steel cords and the rubber member is reduced as a result of use for a long period of time, failure tends to occur, and tire durability tends to deteriorate. However, in recent years, the period of use of a tire tends to be longer, and it becomes more important to enhance reinforcing effect by the steel cords at the belt layer and the carcass layer and to maintain durability for a long period of time.

Japan Unexamined Patent Publication No. 2007-099868 proposes to enhance adhesiveness to steel cords by a rubber composition containing organic acid cobalt salt in a diene rubber. However, even higher levels of improvement in tire durability have been demanded by consumers.

SUMMARY

The present technology provides a pneumatic tire that suppresses edge separation at a belt layer.

The pneumatic tire of an embodiment of the present technology has a belt layer and a carcass layer; a rubber composition for belts, the rubber composition constituting the belt layer and comprising: per 100 parts by mass of a diene rubber containing a natural rubber, from 0.3 to 1.5 parts by mass of cobalt borate neodecanoate and from 4.5 to 7.0 parts by mass of sulfur; a dynamic storage modulus (E') at 20° C. of the rubber composition for belts being from 13 to 18 MPa; and a ratio (MB/MC) of a 100% tensile stress (MB) of the rubber composition for belts to a 100% tensile stress of a rubber composition for carcasses, constituting the carcass layer, (MC) being from 1.5 to 2.5.

Because, in the pneumatic tire of an embodiment of the present technology, a rubber composition for belts contains, per 100 parts by mass of a diene rubber containing a natural rubber, from 0.3 to 1.5 parts by mass of cobalt borate neodecanoate and from 4.5 to 7.0 parts by mass of sulfur, a dynamic storage modulus (E') at 20° C. of the rubber composition for belts is from 13 to 18 MPa, and a ratio (MB/MC) of a 100% tensile stress thereof (MB) to a 100% tensile stress of a rubber composition for carcasses (MC) is from 1.5 to 2.5, edge separation at the belt layer can be suppressed and tire durability can be enhanced equal to or beyond conventional levels.

In the pneumatic tire of an embodiment of the present technology, the rubber composition for carcasses preferably contains SC parts by mass of sulfur per 100 parts by mass of a diene rubber, the rubber composition for belts preferably contains SB parts by mass of the sulfur, and a ratio (SB/SC) of the compounded content of the sulfur of the rubber composition for belts (SB) to the compounded content of the sulfur of the rubber composition for carcasses (SC) is preferably from 2.0 to 3.0.

The rubber composition for belts preferably contains, per 100 parts by mass of the diene rubber, 0.5 parts by mass or greater but less than 3.0 parts by mass of a phenol-based resin and from 0.5 to 5.0 parts by mass of a curing agent.

BRIEF DESCRIPTION OF DRAWING

FIG. 1 is a partial cross-sectional view of a tire meridian direction illustrating one example of an embodiment of the pneumatic tire of the present technology.

DETAILED DESCRIPTION

FIG. 1 is a cross-sectional view illustrating one example of an embodiment of a pneumatic tire of the present technology. The pneumatic tire is formed from a tread portion 1, a sidewall portion 2, and a bead portion 3.

In FIG. 1, two layers of a carcass layer 4, formed by arranging reinforcing cords, which extend in a tire radial direction, in a tire circumferential direction at a predetermined pitch and embedding the reinforcing cords in a rubber layer, are disposed extending between the left and right side bead portions 3. Both ends of the carcass layer 4 are made to sandwich a bead filler 6 around a bead core 5 that is embedded in the bead portions 3 and are folded back in a tire axial direction from the inside to the outside. An innerliner layer 7 is disposed inward of the carcass layer 4. Two layers of a belt layer 8, formed by arranging steel cords extending inclined to the tire circumferential direction in the tire axial direction at a predetermined pitch and embedding these reinforcing cords in a rubber layer, are disposed on an outer circumferential side of the carcass layer 4 of the tread portion 1. The inclination directions with respect to the tire circumferential direction of the steel cords of the two belt layers 8 intersect so as to be opposite each other in the layers. A belt cover layer 9 is disposed outward of the belt layers 8. The rubber layer of the carcass layer 4 is formed from the rubber composition for carcasses, and the coating rubber covering the steel cords of the belt layer 8 is formed from the rubber composition for belts.

In the pneumatic tire of an embodiment of the present technology, the rubber composition for belts, constituting the belt layer, contains cobalt borate neodecanoate and sulfur in a diene rubber containing a natural rubber, and the dynamic storage modulus (E') at 20° C. of this rubber composition for belts is from 13 to 18 MPa.

The diene rubber constituting the rubber composition for belts always contains a natural rubber. The content of the natural rubber is preferably 80 mass % or greater, and more preferably from 90 to 100 mass %, per 100 mass % of the diene rubber. When the content of the natural rubber is less than 80 mass %, adhesiveness (e.g. crossply peel strength) to the steel cords deteriorates, and belt-edge separation may not be suppressed.

The diene rubber constituting the rubber composition for belts may contain another diene rubber besides the natural rubber. Examples of another diene rubber include isoprene rubbers, butadiene rubbers, styrene-butadiene rubbers, acrylonitrile-butadiene rubbers, butyl rubbers, and halogenated butyl rubbers. Among these, isoprene rubbers, butadiene rubbers, styrene-butadiene rubbers, and halogenated butyl rubbers are preferable. These diene rubbers may be used alone or as a desirable blend thereof. The content of such another diene rubber is preferably 20 mass % or less, and more preferably from 0 to 10 mass %, per 100 mass % of the diene rubber.

The rubber composition for belts enhances adhesiveness to steel cords when cobalt borate neodecanoate is contained. The cobalt borate neodecanoate is a compound represented by the general formula (1) below, and the compounded content thereof is from 0.3 to 1.5 parts by mass, preferably greater than 1.0 parts by mass but 1.5 parts by mass or less, per 100 parts by mass of the diene rubber constituting the rubber composition for belts. When the compounded content of the cobalt borate neodecanoate is less than 0.3 parts by mass, durable adhesiveness and initial adhesiveness to steel cords cannot be sufficiently enhanced, and belt-edge separation becomes greater. Furthermore, when the compounded content of the cobalt borate neodecanoate is greater than 1.5 parts by mass, on the contrary, tire durability is decreased.

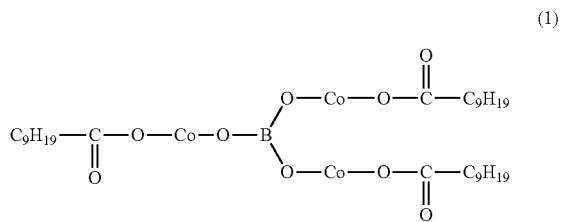

(1)

In the cobalt borate neodecanoate, the cobalt content is preferably from 18 to 26 mass %, and more preferably from 20 to 24 mass %. Examples of the cobalt borate neodecanoate include Manobond C22.5 and Manobond 680C available from Rhodia, CoMend A and CoMend B available from Shepherd, and DICNATE NBC-II available from DIC Corporation.

The rubber composition for belts contains sulfur and a vulcanization accelerator in the diene rubber thereof. The compounded content of the sulfur is from 4.5 to 7.0 parts by mass, and more preferably from 5.0 to 6.5 parts by mass, per 100 parts by mass of the diene rubber constituting the rubber composition for belts. When the compounded content of the sulfur is less than 4.5 parts by mass, tire durability becomes insufficient because belt-edge separation cannot be suppressed. Furthermore, when the compounded content of the sulfur is greater than 7.0 parts by mass, the tire durability is reduced because, on the contrary, the belt-edge separation cannot be suppressed. In the present specification, the compounded content of the sulfur is a net compounded content of the sulfur contained in the sulfur and/or the vulcanizing agent blended for the vulcanization.

In the pneumatic tire of an embodiment of the present technology, the rubber composition for belts contains SB parts by mass of sulfur per 100 parts by mass of the diene rubber constituting the rubber composition for belts. When the rubber composition for carcasses contains SC parts by mass of sulfur per 100 parts by mass of the diene rubber constituting the rubber composition for carcasses, the ratio (SB/SC) of the compounded content of the sulfur of the rubber composition for belts (SB) to the compounded content of the sulfur of the rubber composition for carcasses (SC) is preferably from 2.0 to 3.0, and more preferably from 2.2 to 2.7. When the ratio (SB/SC) of the compounded contents of the sulfur is less than 2.0, 100% tensile stress (MB) of the rubber composition for belts becomes insufficient, belt-edge separation cannot be suppressed, and thus tire durability may be insufficient. Furthermore, the ratio (SB/SC) of the compounded content of the sulfur is greater than 3.0, on the contrary, the belt-edge separation cannot be suppressed, and the tire durability may be reduced. In the present technology, the rubber composition for carcasses may be an ordinary rubber composition for carcasses used in pneumatic tires.

The vulcanization accelerator is not particularly limited and is preferably a sulfenamide-based vulcanization accelerator. Examples of the sulfenamide-based vulcanization accelerator include N,N-dicyclohexyl-1,3-benzothiazole-2-sulfenamide (DZ), N-cyclohexyl-2-benzothiazolesulfenamide (CZ), N-oxydiethylene-2-benzothiazolesulfenamide (OBS), and N-(tert-butyl)benzothiazole-2-sulfenamide (NS). One type of these sulfenamide-based vulcanization accelerators may be blended, or a combination of a plurality of these may be blended. Among these, N,N-dicyclohexyl-1,3-benzothiazole-2-sulfenamide (DZ) and/or N-(tert-butyl)benzothiazole-2-sulfenamide (NS) are preferably blended.

The compounded content of the vulcanization accelerator is preferably from 0.1 to 1.5 parts by mass, and more preferably from 0.2 to 1.2 parts by mass, per 100 parts by mass of the diene rubber. When the compounded content of the vulcanization accelerator is less than 0.1 parts by mass, tire durability may be reduced. Furthermore, when the compounded content of the vulcanization accelerator is greater than 1.5 parts by mass, adhesiveness after deterioration may be reduced.

In the present technology, the dynamic storage modulus (E') of the rubber composition for belts at the dynamic strain of 2% and at 20° C. is from 13 to 18 MPa, preferably from 13.5 to 17.5 MPa, and more preferably from 14 to 17 MPa. When the dynamic storage modulus (E') is less than 13 MPa, the adhesive performance to steel cords is deteriorated, and tire durability becomes insufficient. Furthermore, when the dynamic storage modulus (E') is greater than 18 MPa, adhesion of the rubber when a wire is drawn is deteriorated, and tire durability becomes insufficient. The dynamic storage modulus (E') may be increased or decreased depending on the composition of the rubber composition and the vulcanization conditions, such as temperature and time. In the present specification, the dynamic storage modulus (E') is measured in accordance with JIS (Japanese Industrial Standard) K 6394 by using a viscoelasticity spectrometer under the following conditions: the frequency of 20 Hz, the initial strain of 10%, the dynamic strain of ±2%, and the temperature of 20° C.

In the pneumatic tire of an embodiment of the present technology, the ratio (MB/MC) of the 100% tensile stress of the rubber composition for belts (MB) to the 100% tensile stress of the rubber composition for carcasses that constitutes the carcass layer (MC) is from 1.5 to 2.5, preferably from 1.6 to 2.45, and more preferably from 1.7 to 2.4. When the ratio of the 100% tensile stresses (MB/MC) is less than 1.5, drawing force when a wire is drawn of the rubber composition is deteriorated, and tire durability becomes insufficient. Furthermore, the ratio of the 100% tensile stresses (MB/MC) is greater than 2.5, the aging characteristics of the rubber composition is deteriorated, and tire durability becomes insufficient. The ratio of the 100% tensile stress of the rubber composition for belts to the 100% tensile stress of the rubber composition for carcasses (MB/MC) can be increased or decreased depending on the compositions of the rubber composition for belts and the rubber composition for carcasses and the vulcanization conditions, such as temperature and time. In the present specification, the 100% tensile stress is a tensile stress during 100% deformation of the tensile testing in accordance with JIS K 6251.

The rubber composition for belts of an embodiment of the present technology may contain a phenol-based resin and a curing agent thereof. By allowing the phenol-based resin and the curing agent to be contained, it is possible to enhance hardness, tensile elongation at break, and adhesive performance to steel cords of the rubber composition, and achieve excellent tire durability.

Examples of the phenol-based resin include cresol resins, resorcin resins, alkylphenol resins, and modified phenol resins. Examples of the modified phenol resin include cashew-modified phenol resins, oil-modified phenol resins, epoxy-modified phenol resins, aniline-modified phenol resins, and melamine-modified phenol resins.

The cresol resin is a compound that is obtained by reacting cresol and formaldehyde, and is particularly preferably a compound using m-cresol. Examples of the cresol resin include Sumikanol 610, available from Sumitomo Chemical Co., Ltd., and SP7000 available from Nippon Shokubai Co., Ltd.

The resorcin resin is a compound obtained by reacting resorcin and formaldehyde, and examples thereof include Penacolite B-18-S, Penacolite B-19-S, Penacolite B-20-S, and Penacolite B-21-S, available from INDSPEC Chemical Corporation. Furthermore, as the resorcin resin, a modified resorcin resin may be used, and examples thereof include resorcin resins modified with alkylphenol or the like as well as resorcin-alkylphenol-formalin copolymers and the like.

The cashew-modified phenol resin is a phenol resin modified by using a cashew oil, and examples thereof include SUMILITE resin PR-YR-170 and SUMILITE resin PR-150 available from Sumitomo Bakelite Co., Ltd., and PHENOLITE A4-1419 available from DIC Corporation. The phenol resin is an unmodified resin obtained by a reaction of phenol and formaldehyde, and examples thereof include Sumikanol 620 available from Sumitomo Chemical Co., Ltd.

The compounded content of the phenol-based resin is preferably 0.5 parts by mass or greater but less than 3.0 parts by mass, and more preferably from 0.7 to 2.0 parts by mass, per 100 parts by mass of the diene rubber constituting the rubber composition for belts. When the compounded content of the phenol-based resin is less than 0.5 parts by mass, the dynamic storage modulus (E') is reduced, adhesiveness to steel cords is reduced, and tire durability may be insufficient. Furthermore, when the compounded content of the phenol-based resin is 3.0 parts by mass or greater, on the contrary, tire durability may be reduced.

In the present technology, examples of the curing agent that cures the phenol-based resin described above include hexamethylenetetramine, hexamethoxymethyl melamine, hexamethoxymethylol melamine, pentamethoxymethyl melamine, hexaethoxymethyl melamine, polymers of paraformaldehyde, and N-methylol derivatives of melamine. One type of these methylene donors may be used alone, or any blend of these methylene donors may be used.

Examples of the hexamethylenetetramine include Sanceller HT-PO available from Sanshin Chemical Industry Co., Ltd. Examples of the hexamethoxymethylol melamine (HMMM) include CYREZ 964RPC available from Cytec Industries. Examples of the pentamethoxymethyl melamine (PMMM) include Sumikanol 507A available from Bara Chemical Co., Ltd.

The compounded content of the curing agent is preferably from 0.5 to 5.0 parts by mass, and more preferably from 0.7 to 4.0 parts by mass, per 100 parts by mass of the diene rubber constituting the rubber composition for belts. When the compounded content of the curing agent is less than 0.5 parts by mass, the dynamic storage modulus (E') is reduced, adhesiveness to steel cords is reduced, and tire durability may be insufficient. Furthermore, when the compounded content of the curing agent is greater than 5.0 parts by mass, on the contrary, tire durability may be reduced.

In the present technology, as an inorganic filler, any carbon black, silica, clay, talc, mica, calcium carbonate, and the like may be blended. Among these, carbon black and silica are preferable. Blending of the carbon black can increase the dynamic storage modulus (E'). Blending of the silica can make tan δ at 60° C. smaller.

The rubber composition can also contain various types of additives that are commonly used in rubber compositions for tires, such as vulcanization accelerators, anti-aging agents, peptizing agents, various oils, and plasticizers. These additives may be kneaded according to any common method to form a rubber composition and may be used in vulcanization or crosslinking. The compounded content of these additives may be any known quantity, as long as the object of the present technology is not impaired. The rubber composition can be produced by mixing each of the components described above using a commonly used rubber kneading machine, such as a Banbury mixer, a kneader, and a roller.

The pneumatic tire of an embodiment of the present technology can maintain and/or enhance durability of the pneumatic tire equal to or beyond known levels by suppressing edge separation at the belt layer because the relationship between the rubber compositions constituting the belt layer and the carcass layer is specified.

The present technology is further described below by examples. However, the scope of the present technology is not limited to these examples.

EXAMPLES

To prepare 17 types of rubber compositions shown in Tables 1 and 2 (rubber compositions for carcasses, rubber compositions for belts of Examples 1 to 8, standard example, and Comparative Examples 1 to 7), components other than sulfur and vulcanization accelerators were weighed. These components were kneaded in a 1.7 L sealed Banbury Mixer for 5 minutes. Then, a master batch was discharged and cooled at room temperature. This master batch was supplied to the 1.7 L sealed Banbury mixer, and the sulfur and the vulcanization accelerators were then added and mixed to obtain a rubber composition. In Tables 1 and 2, a net compounded content of the sulfur contained in the vulcanizing agent (product) formed from the sulfur was recorded as the compounded content of sulfur. Furthermore, the ratio (SB/SC) of the compounded content of the sulfur of the rubber composition for belts (SB) to the compounded content of the sulfur of the rubber composition for carcasses (SC) was recorded in Tables 1 and 2.

The rubber composition obtained as described above was vulcanized in a mold with a predetermined shape at 170° C. for 10 minutes to produce a test piece. The dynamic storage modulus (E') and the 100% tensile stress were measured by the methods described below. The tire durability test was also performed by the method described below.

Dynamic Storage Modulus (E')

Using a viscoelastic spectrometer, available from Toyo Seiki Seisaku-sho, Ltd., the dynamic storage modulus (E') at the temperature of 20° C. of the obtained test piece was measured in accordance with JIS K 6394 under conditions at the initial strain of 10%, the dynamic strain of ±2%, and the frequency of 20 Hz. The obtained result is shown in the "E' at 20° C." row of Tables 1 and 2.

100% Tensile Stress

The obtained test piece was used and cut into a dumbbell-shaped JIS No. 3 test piece in accordance with JIS K 6251.

Tensile test was performed according to JIS K 6251 to measure the tensile stress at 100% deformation, and the tensile stress was recorded in Tables 1 and 2. Furthermore, the ratio (MB/MC) of the 100% tensile stress of the rubber composition for belts (MB) to the 100% tensile stress of the rubber composition for carcasses (MC) was calculated and also recorded.

Tire Durability Test

A pneumatic tire (size 295/35R21) was vulcanization-molded by forming a carcass layer by using the obtained rubber composition for carcasses and using the rubber composition for belts (Examples 1 to 8, Standard Example, and Comparative Examples 1 to 7) in the coating rubber of the belt layer. The obtained tire was mounted on a rim (21×10.5 J) and filled with a gas having the oxygen concentration of 60% to the air pressure of 350 kPa and allowed to stand still in an environment at the temperature of 70° C. for 14 days. Thereafter, the air pressure was adjusted to 170 kPa, and the traveling test for 6000 km in a condition at the speed of 60 km/h was performed by using an indoor drum testing machine that had the drum diameter of 1707 mm and that was in accordance with JIS D 4230 while the load was increased from 88%, which was the load specified by JATMA, by 13% every two hours. After the traveling test, the amount (mm) of the edge separation in the belt layer was measured by disassembling the tire. The obtained result is recorded in the "tire durability (separated amount)" row of Tables 1 and 2.

TABLE 1

| | | Rubber composition for carcasses | Rubber composition for belts | | | |
|---|---|---|---|---|---|---|
| | | | Standard Example | Comparative Example 1 | Comparative Example 2 | Comparative Example 3 |
| NR | Parts by mass | 50 | 100 | 100 | 100 | 100 |
| BR | Parts by mass | 25 | | | | |
| SBR | Parts by mass | 25 | | | | |
| CB-1 | Parts by mass | 60 | | | | |
| CB-2 | Parts by mass | | 60 | 60 | 60 | 60 |
| Co stearate | Parts by mass | | | | | |
| Co borate neodecanoate | Parts by mass | | 1.0 | 1.0 | 1.0 | 1.0 |
| Phenol-based resin | Parts by mass | | | | 1.0 | 1.0 |
| Curing agent | Parts by mass | | | | 3.0 | 3.0 |
| Zinc oxide | Parts by mass | 5.0 | 8.0 | 8.0 | 8.0 | 8.0 |
| Anti-aging agent | Parts by mass | 1.0 | 1.0 | 1.0 | 1.0 | 1.0 |
| Sulfur | Parts by mass | 2.5 | 4.0 | 8.0 | 8.0 | 4.0 |
| Vulcanization accelerator-1 | Parts by mass | 1.0 | | | | |
| Vulcanization accelerator-2 | Parts by mass | | 0.7 | 0.7 | 0.7 | 0.7 |
| Compounded ratio of sulfurs (SB/SC) | (—) | — | (1.6) | (3.2) | (3.2) | (1.6) |
| E' at 20° C. | MPa | — | 12.5 | 17.5 | 18.6 | 13.8 |
| 100% Tensile stress | MPa | 3.0 | 4.0 | 8.0 | 8.5 | 4.2 |
| Ratio of 100% tensile stresses (MB/MC) | (—) | — | (1.33) | (2.67) | (2.83) | (1.40) |
| Tire durability (separated amount) | mm | — | 5 | 6 | 6 | 5 |

| | | Rubber composition for carcasses | Rubber composition for belts | | | |
|---|---|---|---|---|---|---|
| | | | Comparative Example 4 | Comparative Example 5 | Comparative Example 6 | Comparative Example 7 |
| NR | Parts by mass | 50 | 100 | 100 | 100 | 100 |
| BR | Parts by mass | 25 | | | | |
| SBR | Parts by mass | 25 | | | | |
| CB-1 | Parts by mass | 60 | | | | |
| CB-2 | Parts by mass | | 70 | 60 | 60 | 60 |
| Co stearate | Parts by mass | | | | | 2.0 |
| Co borate neodecanoate | Parts by mass | | 1.0 | 2.0 | 1.0 | |
| Phenol-based resin | Parts by mass | | 1.0 | 1.0 | 4.0 | |
| Curing agent | Parts by mass | | 3.0 | 3.0 | 6.0 | |
| Zinc oxide | Parts by mass | 5.0 | 8.0 | 8.0 | 8.0 | 8.0 |
| Anti-aging agent | Parts by mass | 1.0 | 1.0 | 1.0 | 1.0 | 1.0 |
| Sulfur | Parts by mass | 2.5 | 6.0 | 6.0 | 6.0 | 6.0 |

TABLE 1-continued

|  |  | Rubber composition for carcasses | Rubber composition for belts | | | |
|---|---|---|---|---|---|---|
|  |  |  | Standard Example | Comparative Example 1 | Comparative Example 2 | Comparative Example 3 |
| Vulcanization accelerator-1 | Parts by mass | 1.0 |  |  |  |  |
| Vulcanization accelerator-2 | Parts by mass |  | 0.7 | 0.7 | 0.7 | 0.7 |
| Compounded ratio of sulfurs (SB/SC) | (—) |  | — | (2.4) | (2.4) | (2.4) |
| E' at 20° C. | MPa | — | 18.5 | 19.2 | 19.0 | 14.5 |
| 100% Tensile stress | MPa | 3.0 | 8.0 | 9.5 | 9.5 | 5.6 |
| Ratio of 100% tensile stresses (MB/MC) | (—) | — | (2.67) | (3.17) | (3.17) | (1.87) |
| Tire durability (separated amount) | mm | — | 6 | 6 | 6 | 8 |

TABLE 2

|  |  | Rubber composition for belts | | | | | | | |
|---|---|---|---|---|---|---|---|---|---|
|  |  | Example 1 | Example 2 | Example 3 | Example 4 | Example 5 | Example 6 | Example 7 | Example 8 |
| NR | Parts by mass | 100 | 100 | 100 | 100 | 100 | 100 | 100 | 100 |
| CB-2 | Parts by mass | 60 | 60 | 60 | 60 | 60 | 60 | 60 | 60 |
| Co stearate | Parts by mass |  |  |  | 1.0 | 1.0 |  |  |  |
| Co borate neodecanoate | Parts by mass | 1.0 | 1.0 | 1.0 | 0.5 | 0.5 | 1.5 | 1.0 | 1.0 |
| Phenol-based resin | Parts by mass |  | 1.0 | 2.0 |  | 1.0 |  |  |  |
| Curing agent | Parts by mass |  | 2.0 | 4.0 |  | 2.0 |  |  |  |
| Zinc oxide | Parts by mass | 8.0 | 8.0 | 8.0 | 8.0 | 8.0 | 8.0 | 8.0 | 8.0 |
| Anti-aging agent | Parts by mass | 1.0 | 1.0 | 1.0 | 1.0 | 1.0 | 1.0 | 1.0 | 1.0 |
| Sulfur | Parts by mass | 6.0 | 6.0 | 6.0 | 6.0 | 6.0 | 6.0 | 5.0 | 7.0 |
| Vulcanization accelerator-2 | Parts by mass | 0.7 | 0.7 | 0.7 | 0.7 | 0.7 | 0.7 | 0.7 | 0.7 |
| Compounded ratio of sulfurs (SB/SC) | (—) | (2.4) | (2.4) | (2.4) | (2.4) | (2.4) | (2.4) | (2.0) | (2.8) |
| E' at 20° C. | MPa | 13.5 | 15.1 | 16.3 | 13.5 | 15.3 | 15.5 | 14.5 | 16.2 |
| 100% Tensile stress | MPa | 5.2 | 6.5 | 7.0 | 5.5 | 6.6 | 6.5 | 5.7 | 6.4 |
| Ratio of 100% tensile stresses (MB/MC) | (—) | (1.73) | (2.17) | (2.33) | (1.83) | (2.20) | (2.17) | (1.90) | (2.13) |
| Tire durability (separated amount) | mm | 2 | 2 | 2 | 4 | 4 | 3 | 4 | 4 |

The types of raw materials used in Tables 1 and 2 are shown below.

NR: natural rubber; TSR20

BR: butadiene rubber; Nipol BR1220, available from Zeon Corporation

SBR: styrene-butadiene rubber; Nipol 1502, available from Zeon Corporation

CB-1: carbon black; Niteron GN, available from NSCC Carbon Co., Ltd.

CB-2: carbon black; SEAST 300, available from Tokai Carbon Co., Ltd.

Co stearate: cobalt stearate; cobalt stearate, available from DIC Corporation (cobalt content: 9.5 mass %)

Co borate neodecanoate: cobalt borate neodecanoate; DICNATE NBC-II, available from DIC Corporation (cobalt content: 22.2 mass %)

Phenol-based resin: resorcin resin; PENACOLITE RESIN B-18-S, available from INDSPEC Curing agent: hexamethoxymethylol melamine (HMMM); CYREZ 964RPC, available from Cytec Industries Zinc oxide: Zinc Oxide III, available from Seido Chemical Industry Co., Ltd.

Anti-aging agent: Santoflex 6PPD, available from Flexsys

Sulfur: MUCRON OT-20, available from Shikoku Chemicals Corporation (sulfur content: 80 mass %)

Vulcanization accelerator-1: N-cyclohexyl-2-benzothiazolesulfenamide; Sanceller CM-PO(CZ), available from Sanshin Chemical Industry Co., Ltd.

Vulcanization accelerator-2: N,N-dicyclohexyl-1,3-benzothiazole-2-sulfenamide; Nocceler DZ, available from Ouchi-Shinko Chemical Industrial Co., Ltd.

As is clear from Table 2, it was confirmed that, with each of the pneumatic tires of Examples 1 to 8, belt-edge separation was suppressed, and tire durability was enhanced.

As is clear from Table 1, with each of the pneumatic tires of Comparative Examples 1 and 2, the amount of belt-edge separation became large because the compounded content of the sulfur of the rubber composition for belts was greater than 7.0 parts by mass, and the ratio (MB/MC) of the 100% tensile stress of the rubber composition for belts to the 100% tensile stress of the rubber composition for carcasses was greater than 2.5.

With the pneumatic tire of Comparative Example 3, the amount of belt-edge separation became large because the compounded content of the sulfur of the rubber composition for belts was less than 4.5 parts by mass, and the ratio (MB/MC) of the 100% tensile stress of the rubber composition for belts to the 100% tensile stress of the rubber composition for carcasses was less than 1.5.

With the pneumatic tire of Comparative Example 4, the amount of belt-edge separation became large because the ratio (MB/MC) of the 100% tensile stress of the rubber composition for belts to the 100% tensile stress of the rubber composition for carcasses was greater than 2.5.

With the pneumatic tire of Comparative Example 5, the amount of belt-edge separation became large because the compounded content of the cobalt borate neodecanoate was greater than 1.5 parts by mass, and the ratio (MB/MC) of the 100% tensile stress of the rubber composition for belts to the 100% tensile stress of the rubber composition for carcasses was greater than 2.5.

With the pneumatic tire of Comparative Example 6, the amount of belt-edge separation became large because the ratio (MB/MC) of the 100% tensile stress of the rubber composition for belts to the 100% tensile stress of the rubber composition for carcasses was greater than 2.5.

With the pneumatic tire of Comparative Example 7, the amount of belt-edge separation became large because no cobalt borate neodecanoate was contained and thus the acid content of the rubber composition for belts increased.

The invention claimed is:

1. A pneumatic tire comprising a belt layer and a carcass layer, wherein
a rubber composition for belts constituting the belt layer contains: per 100 parts by mass of a diene rubber containing a natural rubber, from 0.3 to 1.5 parts by mass of cobalt borate neodecanoate and from 4.5 to 7.0 parts by mass of sulfur,
a dynamic storage modulus (E') at 20° C. of the rubber composition for belts is from 13 to 18 MPa, and
a ratio (MB/MC) of a 100% tensile stress (MB) of the rubber composition for belts to a 100% tensile stress of a rubber composition for carcasses, constituting the carcass layer, (MC) is from 1.5 to 2.5,
wherein the rubber composition for carcasses contains SC parts by mass of sulfur per 100 parts by mass of a diene rubber, the rubber composition for belts contains SB parts by mass of the sulfur, and a ratio (SB/SC) of the compounded content of the sulfur of the rubber composition for belts (SB) to the compounded content of the sulfur of the rubber composition for carcasses (SC) is from 2.0 to 3.0.

2. The pneumatic tire according to claim 1, wherein the rubber composition for belts contains, per 100 parts by mass of the diene rubber, 0.5 parts by mass or greater but less than 3.0 parts by mass of a phenol-based resin and from 0.5 to 5.0 parts by mass of a curing agent.

\* \* \* \* \*